US00RE39857E

(19) United States
(12) Reissued Patent
Shimomura et al.

(10) Patent Number: US RE39,857 E
(45) Date of Reissued Patent: Sep. 25, 2007

(54) INFRARED ABSORPTION FILTER

(75) Inventors: Tetsuo Shimomura, Ohtsu (JP); Shinya Onomichi, Ohtsu (JP); Masanori Kobayashi, Ohtsu (JP); Yozo Yamada, Ohtsu (JP); Seiichiro Yokoyama, Ohtsu (JP)

(73) Assignee: Toyo Boseki Kabushiki Kaisha, Osaka (JP)

(21) Appl. No.: 10/897,393

(22) PCT Filed: May 17, 1999

(86) PCT No.: PCT/JP99/02554

§ 371 (c)(1),
(2), (4) Date: Nov. 13, 2000

(87) PCT Pub. No.: WO99/60430

PCT Pub. Date: Nov. 25, 1999

Related U.S. Patent Documents

Reissue of:
(64) Patent No.: 6,522,463
Issued: Feb. 18, 2003
Appl. No.: 09/700,299
Filed: May 17, 1999

(30) Foreign Application Priority Data

| | | |
|---|---|---|
| May 15, 1998 | (JP) | 10-133030 |
| May 15, 1998 | (JP) | 10-133031 |
| Jul. 8, 1998 | (JP) | 10-193027 |
| Jul. 8, 1998 | (JP) | 10-193028 |
| Sep. 4, 1998 | (JP) | 10-251083 |
| Dec. 3, 1998 | (JP) | 10-344365 |

(51) Int. Cl.
*G02B 00/00* (2006.01)

(52) U.S. Cl. ..... 359/350; 359/359; 359/360; 252/587; 428/411.1

(58) Field of Classification Search ..... 359/350, 359/359, 360, 885; 252/587; 428/411.1
See application file for complete search history.

(56) References Cited

U.S. PATENT DOCUMENTS

| | | | |
|---|---|---|---|
| 3,575,871 | A | 4/1971 | Susi et al. |
| 4,223,974 | A | 9/1980 | Masso |

(Continued)

FOREIGN PATENT DOCUMENTS

| | | |
|---|---|---|
| EP | 0838475 A2 | 4/1998 |
| JP | 10-78509 | 3/1979 |

(Continued)

OTHER PUBLICATIONS

Communication from the European Patent Office herewith transmits as an enclosure the European search report (under R. 44 or R. 45 EPC) for the European Patent Application No. 04018016.8—2217 PCT.

*Primary Examiner*—Fayez G. Assaf
(74) *Attorney, Agent, or Firm*—Kenyon & Kenyon LLP

(57) ABSTRACT

The infrared absorption filter of the present invention has a transmittance of not higher than 30% in the near-infrared region in the wavelength range of 800 to 1100 nm; a difference of 10% or less between a maximum value and a minimum value of transmittance in the visible light region in the wavelength range of 450 to 650 nm; and a transmittance of not lower than 50% at a wavelength of 550 nm, the filter being so excellent in environmental stability that after being left to stand in the air atmosphere at a temperature of 60° C. and a humidity of 95% for 1000 hours, the filter can maintain said spectral property in said range. Consequently, when used for a plasma display or the like, the filter can absorb the unwanted infrared rays radiated from the display, resulting in preventing erroneous operation of a remote control using infrared radiation even in such a high-temperature and high-humidity environment. The filter is gray in color so that when placed in front of a display, the color originated in the display can be seen without discoloration.

19 Claims, 7 Drawing Sheets

U.S. PATENT DOCUMENTS

| | | | | |
|---|---|---|---|---|
| 4,497,700 | A | | 2/1985 | Groth et al. |
| 4,615,989 | A | | 10/1986 | Ritze |
| 4,816,386 | A | * | 3/1989 | Gotoh et al. ..... 430/495 |
| 5,466,755 | A | | 11/1995 | Sakagami et al. |
| 5,804,102 | A | | 9/1998 | Oi et al. |
| 6,255,031 | B1 | | 7/2001 | Yao et al. |
| 6,542,292 | B2 | * | 4/2003 | Onomichi et al. ..... 359/350 |
| 6,777,087 | B2 | * | 8/2004 | Marutsuka ..... 428/411.1 |
| 2005/0163958 | A1 | * | 7/2005 | Nakatsugawa ..... 428/40.1 |

FOREIGN PATENT DOCUMENTS

| | | | |
|---|---|---|---|
| JP | 55-21091 | | 2/1980 |
| JP | 57-21458 | | 2/1982 |
| JP | 57-198413 | | 12/1982 |
| JP | 59-184745 | | 10/1984 |
| JP | 60-43605 | | 3/1985 |
| JP | 60-235740 | | 11/1985 |
| JP | 62-153144 | | 7/1987 |
| JP | 6-324213 | | 11/1994 |
| JP | 7-134209 | | 5/1995 |
| JP | 7-314626 | | 12/1995 |
| JP | 8-106059 | * | 4/1996 |
| JP | 09-306366 | | 11/1997 |
| JP | 10-105076 | | 4/1998 |
| WO | WO97/38855 | | 10/1997 |

* cited by examiner

INFRARED ABSORPTION FILTER

Matter enclosed in heavy brackets [ ] appears in the original patent but forms no part of this reissue specification; matter printed in italics indicates the additions made by reissue.

*CROSS REFERENCE TO RELATED APPLICATION*

*More than one reissue application has been filed for the reissue of U.S. Pat. No. 6,522,463. The reissue applications are application Ser. No. 10/897,394, and its continuation, application Ser. No. 10/897,393 (the present application).*

FIELD OF THE INVENTION

The present invention relates to an optical fiber, and more particularly to an optical filter which has a high transmittance in the visible light region and which is capable of intercepting infrared radiation. The filter of the present invention is especially useful for display purposes.

BACKGROUND ART

The following filters have been conventionally used as a heat ray-absorbing filter or as a filter for adjusting the visibility of video camera:

(1) a filter composed of phosphate glass containing metallic ions such as copper or iron ions (Japanese Unexamined Patent Publication No.235740/1985, Japanese Unexamined Patent Publication No.153144/1987, etc.);

(2) an interference filter having plural layers differing from each other in refractive index on a substrate to allow light of specific wavelength to pass by interference of transmitted light (Japanese Unexamined Patent Publication No.21091/1980, Japanese Unexamined Patent Publication No.184745/1984, etc.);

(3) an acrylic resin filter composed of a copolymer containing copper ions (Japanese Unexamined Patent Publication No.324213/1994); and (4) a filter composed of a binder resin and a coloring matter dispersed in the binder resin (Japanese Unexamined Patent Publication No.21458/1982, Japanese Unexamined Patent Publication No.198413/1982, Japanese Unexamined Patent Publication No.43605/1985, etc.).

The above-mentioned conventional infrared absorption filters have problems as described below.

The filter (1) exhibits sharp absorption in the near-infrared region and can intercept infrared radiation at a very high ratio. However, the filter (1) pronouncedly absorbs part of red color in the visible light region so that the transmitted color looks blue. For display purposes, importance is laid on a color balance. In such case, it is difficult to use the filter (1). Another problem is raised about the processability of the filter (1) because it is made of glass.

The optical properties of the filter (2) can be freely designed. Further a filter having properties almost equal to the designed properties can be produced. However, the filter (2) necessitates a plurality of layers differing in refractive index from each other for this purpose, consequently entailing a drawback of incurring high production costs. Moreover, when a large area is required, the filter (2) should have a uniform thickness of high precision over the entire area, resulting in a difficulty in producing the filter.

The filter (3) has improved processability compared with the filter (1). However, the filter (3) exhibits sharp absorption and absorbs the red color of light beams as is the case with the filter (1), raising the same problem as the filter (1) that the filter (3) looks blue.

In the filter (4), various infrared-absorbing materials can be used. Examples of useful materials are phthalocyanine, nickel complex, azo compound polymethine, diphenylmethane, triphenylmethane, quinone and the like. However, when singly used, these materials pose problems of showing insufficient absorption or absorbing a visible light of specific wavelength in the visible light region. Further, when the filter is left to stand at a high temperature or a high humidity for a long time, the infrared-absorbing materials involve problems of decomposing or oxidizing, bringing about absorption in the visible light region or ceasing absorption in the infrared region.

An object of the present invention is to provide an infrared absorption filter which can achieve absorption in the near-infrared region, the filter showing a high transmittance in the visible light region, being free from marked absorption of a light of specific wavelength in the visible light region, and being excellent in environmental stability and in processability and productivity.

DISCLOSURE OF THE INVENTION

The present invention was completed in view of the foregoing situation. The infrared absorption filters of the present invention which have overcome the above-mentioned problems are as described below.

The first invention provides an infrared-absorbing filter which has a transmittance of not higher than 30% in the near-infrared region in the wavelength range of 800 to 1100 nm; a difference of 10% or less between a maximum value and a minimum value,of transmittance in the visible light region in the wavelength range of 450 to 650 nm; and a transmittance of not lower than 50% at a wavelength of 550 nm, said filter, after being left to stand in the air atmosphere of a temperature of 60° C. and a humidity of 95% for 1000 hours, having a transmittance of not higher than 30% in the near-infrared region in the wavelength range of 800 to 1100 nm, and a difference of 10% or less between a maximum value and a minimum value of transmittance in the visible light region in the wavelength range of 450 to 650 nm.

The second invention provides an infrared absorption filter as defined in the first invention, wherein after being left to stand in the air atmosphere of a temperature of 80° C. for 1000 hours, the filter has a transmittance of not higher than 30% in the near-infrared region in the wavelength range of 800 to 1100 nm and has a difference of 10% or less between a maximum value and a minimum value of transmittance in the visible light region in the wavelength range of 450 to 650 nm.

The third invention provides an infrared absorption filter as defined in the first invention, wherein the filter has an infrared-absorption layer on a transparent substrate, the layer being composed of a coloring matter, dye or pigment for absorbing infrared radiation and a polymer serving as a dispersing medium.

The 4th invention provides an infrared absorption filter as defined in the third invention, wherein the amount of the solvent remaining in the infrared-absorbing layer is 5.0 wt. % or less.

The 5th invention provides an infrared absorption filter as defined in the third invention, wherein the transparent substrate has a total light transmittance of not lower than 89%, a haze of not higher than 1.6%, a coefficient of static friction of not higher than 0.6 and a coefficient of dynamic friction of not higher than 0.6.

The 6th invention provides an infrared absorption filter as defined in the third invention, wherein the transparent substrate is a polyester film.

The 7th invention provides an infrared absorption filter as defined in the third invention, wherein the polymer constituting the infrared-absorption layer has a glass transition temperature of not lower than 80° C.

The 8th invention provides an infrared absorption filter as defined in the 7th invention, wherein the polymer constituting the infrared-absorbing layer is a polyester resin.

The 9th invention provides an infrared absorption filter as defined in the third invention, wherein the filter has an electroconductive layer of metal mesh having an aperture ratio of not less than 50% on the same side as the infrared-absorbing layer of the filter or on the opposed side thereof.

The 10th invention provides an infrared absorption filter as defined in the third invention, wherein the filter has a transparent electroconductive layer on the same side as the infrared-absorbing layer of the filter or on the opposed side thereof.

The 11th invention provides an infrared absorption filter as defined in the 10th invention, wherein the transparent electroconductive layer is formed of a metal oxide.

The 12th invention provides an infrared absorption filter as defined in the 10th invention, wherein the transparent electroconductive layer has a repeatedly laminated structure in which at least three layers are laminated in the order of metal oxide/metal/metal oxide.

The 13th invention provides an infrared absorption filter as defined in the 12th invention, wherein the constituent metal layer of the transparent electroconductive layer is formed of silver, gold, or a compound containing any of them.

The 14th invention provides an infrared absorption filter as defined in the first invention, wherein a hard coat-treated layer is formed as an outermost layer of the filter.

The 15th invention provides an infrared absorption filter as defined in the first invention, wherein an antireflection layer is formed as an outermost layer of the filter.

The 16th invention provides an infrared absorption filter as defined in the first invention, wherein an antiglare-treated layer is formed as an outermost layer of the filter.

The 17th invention provides an infrared absorption filter as defined in the first invention, wherein the filter is disposed in front of a plasma display.

The infrared absorption filter of the present invention is required to have a transmittance of not higher than 30% in the near-infrared region in the wavelength range of 800 to 1100 nm. Since the infrared absorption filter of the present invention has a low transmittance in this region, the filter used for a plasma display or the like can absorb the unwanted infrared radiation emitted from the display, thereby making it possible to prevent erroneous operation of a remote control using infrared radiation.

The infrared absorption filter of the present invention essentially has a difference of 10% or less between a maximum value and a minimum value of transmittance in the visible light region in the wavelength range of 450 to 650 nm. When the infrared absorption filter of the present invention has the difference in this range of transmittance within the wavelength range of 450 to 650 nm, the filter is given a gray color, and the color originating from the display can be seen without discoloration.

Further, the infrared absorption filter of the present invention essentially has a transmittance of not lower than 50% at a wavelength of 550 nm. If the transmittance is lower than 50% at said wavelength, the display looks very dark when the filter is placed in front of the display.

After being left to stand in the air atmosphere at a temperature of 60° C. and a humidity of 95% for 1000 hours, the infrared absorption filter of the invention essentially has a transmittance of not higher than 30% in the near-infrared region in the wavelength range of 800 to 1100 nm and a difference of 10% or less is found between a maximum value and a minimum value of transmittance in the visible light region in the wavelength range of 450 to 650 nm.

After being left to stand in the air atmosphere at a temperature of 80° C. for 1000 hours, the infrared absorption filter of the invention preferably has a transmittance of not higher than 30% in the near-infrared region in the wavelength range of 800 to 1100 nm and a difference of 10% or less is recognized between a maximum value and a minimum value of transmittance in the visible light region in the wavelength range of 450 to 650 nm.

Embodiments of the present invention are described below in detail.

According to a preferred embodiment of the invention, an infrared absorption filter is prepared by dispersing an infrared-absorbing material(s) in a polymer and coating a transparent substrate with the obtained dispersion. This process simplifies the production and enables small-lot production.

Preferably the amount of residual solvent(s) in a coating layer of the infrared absorption filter is 5.0 wt. % or less, the filter being prepared by depositing a composition on a substrate, the composition being prepared by dispersing in a binder resin a near-infrared-absorbing material(s) containing a diimmonium salt compound represented by the formula (1)

(1)

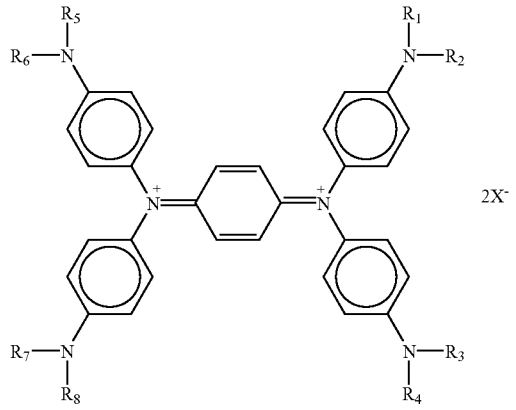

wherein $R_1$–$R_8$ are the same or different from each other and each represents hydrogen or alkyl having 1 to 12 carbon atoms, and X represents $SbF_6$, $ClO_4$, $PF_6$, $NO_3$ or halogen.

If the filter containing more than 5.0 wt. % of the solvent in the coating layer is left to stand at a high temperature and a high humidity for a long time, the diimmonium salt compound undergoes chemical change and absorption decreases in the near-infrared region, resulting in insufficient interception of near-infrared radiation. In this case, absorption increases in the visible light region, leading to discoloration of the filter in its entirety to deep yellowish green.

To bring the amount of residual solvent(s) to 5.0 wt. % or less, the drying conditions of the following equations (2) to (4) should be simultaneously fulfilled. The factors in the equation (2) are expressed in the units described [blow] *below*: the wind velocity in m/sec, hot air temperature in °C., drying time in [minute] *minutes* and thickness of coating layer in μm.

$$\text{Wind velocity} \times (\text{hot air temperature} - 20) \times \text{drying time/thickness of coating layer} > 48 \quad (2)$$

$$\text{Hot air temperature:} \geqq 80°\text{C.} \quad (3)$$

$$\text{Drying time:} [\geqq] \leqq 60 \text{ minutes} \quad (4)$$

Binder resins for use herein are not limited insofar as they can uniformly disperse the near-infrared-absorbing material used in the invention. Suitable examples include, for example, polyester resins, acrylic resins, polyamide resins polyurethane resins, polyolefin resins, polycarbonate resins and the like. Desirably the binder resin for dispersing the near-infrared-absorbing material(s) has a glass transition temperature which is not less than the assumed guaranteed temperature for use of the filter of the invention. Thereby the stability of the near-infrared-absorbing material is increased. The assumed guaranteed temperature for use of the filter of the invention is preferably 80° C. or higher, more preferably 85° C. or higher.

Solvents useful in preparing a coating solution in the coating process can be any solvent insofar as they can uniformly disperse the near-infrared-absorbing material and the binder for use herein. Examples of useful solvents are acetone, methyl ethyl ketone, methyl isobutyl ketone, ethyl acetate, propyl acetate, methanol, ethanol, isopropyl alcohol, ethyl cellosolve, benzene, toluene, xylene, tetrahydrofuran, n-hexane, n-heptane, methylene chloride, chloroform, N,N-dimethylformamide, water and the like to which the solvents for use herein are not limited.

There is not limitation on infrared-absorbing materials useful in the present invention. Examples are as follows.

As the near infrared-absorbing materials, in addition to the diimmonium salt compound of the formula (1), one or both of fluorine-containing phthalocyanine compound and dithiol metal complex compound can preferably be contained in the coating solution. The coating solution preferably contains at least two species of diimmonium salt compound, fluorine-containing phthalocyanine compound and nickel complex compound. Preferred proportions of the near infrared-absorbing materials are 0.5 to 0.01 parts by weight of fluorine-containing phthalocyanine compound if used and 1 to 0 part by weight of nickel complex compound, per part by weight of the diimmonium salt compound.

Examples of the diimmonium salt compound of the formula (1) are N,N,N', N'-tetrakis(p-di-n-butylaminophenyl)-p-benzoquinone-diimmonium.ditetrafluoroantimonate, N,N,N',N'-tetrakis(p-diethylaminophenyl)-p-benzoquinone-diimmonium.ditetrafluoroantimonate, N,N,N',N'-tetrakis(p-di-n-butylaminophenyl)-p-benzoquinone-diimmonium.diperchlorate, N,N,N',N'-tetrakis(p-diethylaminophenyl)-p-benzoquinone-diimmonium.diperchlorate, N,N,N',N'-tetrakis(p-diisopropylaminophenyl)-p-benzoquinone-diimmonium.ditetrafluorophosphate, N,N,N',N'-tetrakis(p-n-propylaminophenyl)-p-benzoquinone-diimmonium.dinitrate and so on to which, however, useful diimmonium salt compounds are not limited. Some of them are commercially available. Among them, Kayasorb IRG-022, IRG-023 and the like (products of NIPPON KAYAKU Co., Ltd.) are suitably usable.

Useful fluorine-containing phthalocyanine compounds include, for example, Excolor IR1, IR2, IR3 and IR4 (products of NIPPON SHOKUBAI Co., Ltd.). Useful dithiol metal complex compounds include, for example, SIR-128, SIR-130, SIR-132 and SIR-159 (products of Mitsui Chemicals, Inc.).

The infrared absorption filter of the present invention preferably contains a UV-absorbing agent to enhance the resistance to light. Furthermore, in the present invention, the polymer for dispersing the infrared-absorbing material may be crosslinked with a crosslinking agent to impart weatherability and resistance to solvents to the filter.

There is no limitation on transparent substrate films for use in the infrared absorption filter of the present invention. Useful transparent substrate films include, for example, stretched films formed of polyester resins, acrylic resins, cellulose resins, polyethylene resins, polypropylene resins, polyolefin resins, polyvinyl chloride resins, polycarbonate, phenolic resins, urethane resins or the like. From the standpoint of dispersion stability, environmental load and the like, polyester films are preferable.

In the infrared absorption filter having the infrared-absorbing layer on at least one side of the transparent polymer film, the transparent polymer film preferably has a total light transmittance of not lower than 89%, a haze of not higher than 1.6%, a coefficient of static friction of not higher than 0.6 and a coefficient of dynamic friction of not higher than 0.6.

The infrared absorption filter of the invention which is often used for display purposes has desirably a high total light transmittance, and desirably a low haze. However, if inert particles capable of imparting an uneven surface to the film are used in a reduced amount to increase the total light transmittance and to reduce the haze, generally the coefficient of friction is increased and the slidability is deteriorated, making it difficult to carry out the winding or like operation. If the total light transmittance, haze and coefficient of friction are within the ranges of the invention, it is possible to bring both the windability and the total light transmittance to the desired ranges.

In order to give the total light transmittance, haze and coefficient of friction in the above mentioned ranges, it is desirable to form a coating layer of 30 to 300 [μm] *nm* thickness on the substrate polymer film, the coating layer containing inert particles of small average particle size not higher than the wavelength of visible light and not to incorporate inert particles into the substrate polymer film.

Examples of such inert particles are calcium carbonate, calcium phosphate, silica, kaolin, talc, titanium dioxide, alumina, barium sulfate, calcium fluoride, lithium fluoride, zeolite, molybdenum sulfide and like inorganic particles, crosslinked polymer particles, calcium oxalate and like organic particles. Among them, silica particles are the most suitable because they have a refractive index relatively similar to that of polyester resin and facilitates formation of a highly transparent film.

The inert particles to be incorporated into the coating layer have an average particle size of preferably 0.01 to 1.0 μm, more preferably 0.02 to 0.5 μm, most preferably 0.03 to 0.3 μm. If the average particle size of inert particles is greater than 1.0 μm, reduced transparency of the film tends to result, whereas the average particle size of less than 0.01 μm tends to deteriorate the handleability (slidability, windability, blocking prevention, etc.) of the film. The amount of inert particles to be incorporated into the coating layer is 0.1 to 60 wt. %, preferably 0.5 to 50 wt. %, more preferably 1.0 to 40 wt. %, based on the amount of solid in an adhesive layer. If the amount of inert particles in the coating layer exceeds 60 wt. %, it is likely to impair the adhesive property of the film and to deteriorate the transparency of the film, whereas less than 0.1 wt. % is likely to deteriorate the handleability (slidability, windability, blocking prevention, etc.) of the film.

The filter of the invention preferably has a transparent electroconductive layer or an electroconductive layer of metal mesh having an aperture ration of not less than 50% on the same side as the infrared-absorbing layer of the filter or on the opposed side thereof. Thereby detrimental electromagnetic waves emitted from a display can be removed.

Metal meshes useful in the present invention include, for example, metal foils of high electroconductivity treated by etching to give a mesh, fabric meshes produced from metallic fibers, meshes produced, e.g. by plating a metal on the surface of polymeric fibers, etc. Metals to be used for the electromagnetic wave-absorbing layer are not Limited and can be any metal insofar as the metal is excellent in the electroconductivity and in stability. However, copper, nickel, tungsten and the like are preferred from the viewpoints of processability and costs.

The transparent electroconductive layer to be formed in the present invention can be any electroconductive layer, but is preferably one formed from a metal oxide which enables attaining a higher visible light transmission. To increase the electroconductivity of the transparent electroconductive layer, it is preferred to provide a repeatedly laminated structure in which at least three layers are laminated in the order of metal oxide/metal/metal oxide. The multilayered metal structure provides the layer with the desired electroconductivity while retaining the high visible light transmission.

Metal oxides for use in the invention can be any metal oxide insofar as they have the desired electroconductivity and visible light transmission. Useful metal oxides include, for example, tin oxide, indium oxide, indium tin oxide, zinc oxide, titanium oxide, bismuth oxide, etc. to which useful metal oxides are not limited. The metal layers to be employed in the invention are preferably those formed of gold, silver or compounds containing any of them from the viewpoint of electroconductivity.

When the electroconductive layer has a multi-layered structure, e.g., a three-layer structure comprising layers each formed of metal oxide, metal and metal oxide, respectively in this order, the thickness of silver layer is preferably 50 to 200 Å, more preferably 50 to 100 Å. If the silver layer has a thickness exceeding 200 Å, the light transmission is reduced, whereas less than 50 Å increases the resistance value. The thickness of metal oxide layer is preferably 100 to 1000 Å, more preferably 100 to 500 Å. If the thickness of metal oxide layer is greater than 1000 Å, coloration occurs, resulting in discoloration, whereas less than 100 Å thickness increases the resistance value. When a structure of more than three layers is provided, e.g., a 5-layered structure composed of metal oxide, silver, metal oxide, silver and metal oxide in this order, the thickness of intermediate metal oxide layer is preferably greater than the other metal oxide layers. This increases the light transmission throughout the multilayered structure.

A hard coat-treated layer (HC) may be formed as an outermost layer to prevent marring on the infrared absorption filter of the invention. The hard coat-treated layer (HC) may be desirably a cured layer of crosslinkable resin, such as polyester resin, urethane resin, acrylic resin, melamine resin, epoxy resin, silicone resin, polyimide resin or the like which may be used alone or in admixture.

The hard coat-treated layer (HC) has a thickness of preferably 1 to 50 μm, more preferably 2 to 30 μm. The thickness of less than 1 μm, the hard coat-treated layer fails to sufficiently achieve the intended function, whereas the thickness of more than 50 μm retards the resin-coating operation, making it difficult to obtain a good result concerning the productivity.

The hard coat-treated layer (HC) can be formed on the surface of the side opposed to the side of the transparent electroconductive film, by coating said surface with the above-mentioned resin by gravure process, reverse process, dyeing process or the like, followed by application of heat, ultraviolet rays, electron rays or like energy to cure the deposited resin.

The infrared absorption filter of the invention may contain an antiglare-treated layer (AG) as an outermost layer to enhance the visibility when used for display purposes.

The antiglare-treated layer (AG) can be formed by coating the surface to be treated with a curable resin, drying the layer, giving an uneven surface by an embossing roll, and applying heat, ultraviolet rays, electron rays or like energy to cure the deposited resin. Useful curable resins are, for example, polyester resins, urethane resins, acrylic resins, melamine resins, epoxy resins, silicone resins, polyimide resins and the like which may be used alone or in admixture.

The infrared absorption filter of the invention may contain an antiflection-treated layer (AR) as an outermost layer to enhance the visible light transmission when used for display purposes. The antiflection-treated layer (AR) may be desirably a single layer or plural layers of a material(s) which is different in refractive index from the plastic film. The single layer structure is preferably composed of a material which is lower in refractive index than the plastic film. To form a multilayered structure, recommendably the material for the layer adjacent to the plastic film has a higher refractive index than the plastic film and the material for the layer or layers over the said adjacent layer has a lower refractive index than the adjacent layer. Materials for forming the antireflection-treated layer (AR) are not limited and may be either organic or inorganic insofar as they can fulfill said relationship of refractive index. Preferred materials are dielectric materials such as $CaF_2$, $MgF_2$, $NaAlF_4$, $SiO_2$, $ThF_4$, $Nd_2O_3$, $SnO_2$, $TiO_2$, $CeO_2$, ZnS, $In_2O_3$, etc.

The antireflection-treated layer (AR) can be produced by a dry coating process such as vacuum deposition process, sputtering process, CVD process, ion plating process or the like or a wet coating process such as gravure process, reverse process, dyeing process or the like.

Prior to formation of the hard coat-treated layer (HC), antiglare-treated layer (AG) or antireflection-treated layer (AR), various pretreatments may be carried out, which include, for example, conventional treatments such as corona discharge treatment, plasma treatment, sputtering treatment, electron beam irradiation treatment, UV irradiation treatment, primer treatment, adhesivity-increasing treatment and the like.

Examples of Embodiments

The present invention will be described in more detail with reference to the following Examples to which, however, the invention is not limited. Given below are methods of measuring the property values used herein and methods of evaluating the effect.

(1) Spectral Property

The spectral property was measured with a self-recording spectrophotometer (Hitachi U-3500 model) in the wavelength range of 1500 to 200 nm.

(2) Environmental Stability

1) Moisture Resistance

After the sample was left to stand in the atmosphere of a temperature of 60° C. and a humidity of 95% for 1000 hours, the above-mentioned spectral property was measured.

2) Heat Resistance

After the sample was left to stand in the air atmosphere at 80° C. for 1000 hours, the above-mentioned spectral property was measured.

(3) Amount of Solvent(s) Remaining in the Coating Layer

The amount of residual solvent(s) was measured using GC-9A (manufactured by Shimadzu Corp.) as follows. About 5 mg of the sample was precisely weighted out and was trapped with heating to 150° C. at an inlet port of a gas chromatograph for 5 minutes. Then the total amount (A: ppm) of toluene, tetrahydrofuran (THF) and methyl ethyl ketone (MEK) was measured. Since the peaks of THF and MEK overlap each other, they were compared with the reference peak (toluene) and the combined value was determined as conversion value to toluene. Aside from the above, a piece of 10 cm square was cut off from the sample and was weighed out (B: g) and the coating layer was wiped with the solvents. The difference (C: g) between the weights of the sample before and after wiping was determined. The amount of residual solvents was calculated by the following equation.

$$\text{The amount of residual solvents (\%)} = A \times B \times 10^{-4}/C$$

(4) Total Light Transmittance and Haze

Measured with a haze meter (product of Tokyo Denshoku Kogyo K.K., Model TC-H3DP) according to JIS K 7105

(5) Coefficient of Friction

The coefficient of static friction (μs) and the coefficient of dynamic friction (μd) were obtained according to JIS K 7125.

EXAMPLE 1

A base polyester to be used as a dispersing medium was prepared as follows. Charged into an autoclave equipped with a thermometer and a stirrer were:

| | |
|---|---|
| Dimethyl terephthalate | 136 wt. Parts |
| Dimethyl isophthalate | 58 wt. Parts |
| Ethylene glycol | 96 wt. parts |
| Tricyclodecane dimethanol | 137 wt. parts |
| Antimony trioxide | 0.09 wt. part |

These ingredients were heated to 170 to 220° C. for 180 minutes to undergo an ester exchange reaction. Then the temperature of the reaction system was elevated to 245° C. to continue the reaction under a pressure of 1 to 10 mmHg for 180 minutes, giving a polyester copolymer resin (A1). The polyester copolymer resin (A1) had an inherent viscosity of 0.4 dl/g and a glass transition temperature of 90° C. NMR analysis gave the following copolymer composition ratio:

| | |
|---|---|
| Acid components | |
| Terephthalic acid | 71 mol % |
| Isophthalic acid | 29 mol % |
| Alcohol components | |
| Ethylene glycol | 28 mol % |
| Tricyclodecane dimethanol | 72 mol % |

A flask was charged with the infrared-absorbing materials, the above-obtained resin and the solvents shown in Table 1 in the proportions indicated therein. The mixture was heated with stirring to dissolve the infrared-absorbing materials and the binder resin in the solvents. The resin solution was applied to a highly transparent polyester film substrate of 100 μm thickness having a slidable surface on one side and a smooth surface on the other side (product of Toyo Boseki K.K., "Cosmoshine A 4100; total light transmittance 90.9%, haze 0.7, coefficient of static friction (slidable surface/smooth surface: 0.58/>1), coefficient of dynamic friction (slidable surface/smooth surface: 0.42/>1)) using an applicator with a gap of 100 μm. The deposited layer was dried at a wind velocity of 0.4 m/s and a temperature of 90° C. in a hot air drier for 1 hour. The resulting coating film had a thickness of 25 μm.

The obtained infrared absorption filter had a color of dark gray when seen. The spectral property qf the filter is shown in FIG. 1. As shown in FIG. 1, the absorption was plotted as flat in the visible light region in the wavelength range of 400 to 650 nm. A difference was 4.8% between a maximum value and a minimum value of transmittance in the wavelength range of 450 to 650 nm, and the transmittance in the wavelength range was 69.4% at lowest. The sharp absorption was observed in the wavelength range of 700 nm or higher. The transmittance was 23.4% at highest in the wavelength range of 800 to 1100 nm.

The obtained filter was left to stand in the atmosphere of a temperature of 60° C. and a humidity of 95% for 1000 hours, and the spectral property was evaluated again with the results shown in FIG. 2. While a slight color change occurred, a difference of 9.8% was found between a maximum value and a minimum value of transmittance in the wavelength range of 450 to 650 nm and the transmittance in the wavelength range was 65.5% at lowest. The transmittance was 29.1% at highest in the wavelength range of 800 to 1100 nm and the filter retained the near-infrared-absorbing property.

Further, the obtained filter was left to stand in the atmosphere of a temperature of 80° C. for 1000 hours, and the spectral property was evaluated again with the results shown in FIG. 3. While a slight color change was brought about, a difference was 5.8% between a maximum value and a minimum value of transmittance in the wavelength range of 450 to 650 nm and the transmittance in the wavelength range was 67.2% at lowest. The transmittance was 21.0% at highest in the wavelength range of 800 to 1100 nm and the filter retained the near-infrared-absorbing property.

When disposed in front of a plasma display or the like, the obtained filter showed no change of color and increased the contrast, resulting in reduced level of near-infrared radiation.

TABLE 1

| Ingredient | Material | Amount |
|---|---|---|
| Near-infrared-absorbing material | Diimmonium salt compound, Kyasorb IRG-022 manufactured by Nippon Kayaku Co., Ltd. | 3.2 wt. Parts |
| | Fluorine-containing phthalocyanine compound, Excolor IR-1 manufactured by Nippon Shokubai Co., Ltd. | 0.5 wt. Part |
| | Dithiol metal complex compound, SIR-159 manufactured by Mitsui Chemicals, Inc. | 1.6 wt. Parts |
| Binder resin | Polyester copolymer resin (A1) | 440 wt. Parts |

TABLE 1-continued

| Ingredient | Material | Amount |
|---|---|---|
| Solvent | Methyl ethyl ketone | 490 wt. Parts |
| | Tetrahydrofuran | 490 wt. Parts |
| | Toluene | 490 wt. Parts |

Comparative Example 1

Vylon RV 200 manufactured by Toyo Boseki K.K., (specific weight 1.26, glass transition temp. 67° C.) was used as a base polymer. A flask was charged with the infrared-absorbing materials, the binder resin and the solvents as shown in Table 2 in the proportions indicated therein. These ingredients were heated with stirring to dissolve the the infrared-absorbing materials and the binder resin in the solvents. The resin solution was applied to a highly transparent polyester film substrate of 100 μm thickness (product of Toyo Boseki K.K., "Cosmoshine A 4100") using an applicator with a gap of 100 μm. The deposited layer was dried at a wind velocity of 0.4 m/s and a temperature of 90° C. in a hot air drier for 1 hour. The resulting coating film had a thickness of 25 μm. The obtained infrared absorption filter had a brown color when seen. As shown by the spectral property of the filter in FIG. 4, the absorption was plotted in a mountain-shaped form having a peak at about 550 nm in the visible light region in the wavelength range of 400 to 650 nm. A difference was 11.5% between a maximum value and a minimum value of transmittance in the wavelength range of 450 to 650 nm, and the transmittance in the wavelength range was 71.4% at lowest. The sharp absorption was observed in the wavelength range of 700 nm or higher. The transmittance was 44.0% at highest in the wavelength range of 800 to 1100 nm. The filter looked green when seen. When disposed in front of a plasma display of the like, the obtained filter lost a color balance, and turned greenish.

The obtained filter was left to stand in the atmosphere of a temperature of 60° C. and a humidity of 95% for 1000 hours, and the spectral property was evaluated again with the following results. A difference was increased from 11.5% to 28.6% between a maximum value and a minimum value of transmittance in the wavelength range of 450 to 650 nm and the transmittance in the wavelength range was 54% at lowest. The transmittance was increased to 49.0% at highest in the wavelength range of 800 to 1100 nm. The filter was deep green when seen. The spectral property is shown in FIG. 5. When disposed in front of a plasma display or the like, the obtained filter lost a color balance, and turned greenish.

Further, the obtained filter was left to stand in the atmosphere of a temperature of 80° C. for 1000 hours, and the spectral property was evaluated again with the following results. A difference rose from 11.5% to 20.3% between a maximum value and a minimum value of transmittance in the wavelength range of 450 to 650 nm and the transmittance in the wavelength range was 61.8% at lowest. The transmittance was increased to 47.2% at highest in the wavelength range of 800 to 1100 nm. The filter was deep green when seen. The spectral property of the filter is shown in FIG. 6. When disposed in front of a plasma display or the like, the obtained filter lost a color balance, and turned greenish.

TABLE 2

| Ingredient | Material | Amount |
|---|---|---|
| Near-infrared-absorbing material | Diimmonium salt compound, Kyasorb IRG-022 manufactured by Nippon Kayaku Co., Ltd. | 3.2 wt. parts |
| Binder resin | Vylon RV 200 manufactured by Toyo Boseki K.K. | 440 wt. parts |
| Solvent | Methyl ethyl ketone | 490 wt. parts |
| | Tetrahydrofuran | 490 wt. parts |
| | Toluene | 490 wt. parts |

Comparative Example 2

Vylon RV 200 (product of Toyo Boseki K.K., specific weight 1.26, glass transition temp. 67° C.) was used as a base polymer. A flask was charged with the infrared-absorbing materials, the binder resin and the solvents as shown in Table 3 in the proportions indicated therein. These ingredients were heated with stirring to dissolve the infrared-absorbing materials and the binder resin in the solvents. The resin solution was applied to a highly transparent polyester film substrate of 100 μm thickness (product of Toyo Boseki K.K., "Cosmoshine A 4100") using an applicator with a gap of 100 μm. The deposited layer was dried at a wind velocity of 0.4 m/s and a temperature of 90° C. in a hot air drier for 1 hour. The resulting coating film had a thickness of 25 μm.

The obtained infrared absorption filter was dark gray when seen. The spectral property of the filter was substantially the same as in Example 1. The absorption was plotted as flat in the visible light region in the wavelength range of 400 to 650 nm. The sharp absorption was observed at 700 nm or more.

The obtained filter was left to stand in the atmosphere of a temperature of 60° C. and a humidity of 95% for 1000 hours, and the spectral property was evaluated again with the results shown in FIG. 7. A difference was increased from 4.8% to 27.4% between a maximum value and a minimum value of transmittance in the wavelength range of 450 to 650 nm, and the transmittance in the wavelength range was 44.0% at lowest. The transmittance was increased to 47.2% at highest in the wavelength range of 800 to 1100 nm. The filter looked green when seen. When disposed in front of a plasma display or the like, the obtained filter lost a color balance, and turned greenish.

Further the obtained filter was left to stand in the atmosphere of a temperature of 80° C. for 1000 hours, and the spectral property was evaluated again with the results shown in FIG. 8. A difference was increased from 4.8% to 16.6% between a maximum value and a minimum value of transmittance in the wavelength range of 450 to 650 nm and the transmittance in the wavelength range was 56.3% at lowest. The transmittance was increased to 30.2% at highest in the wavelength range of 800 to 1100 nm. The filter looked green when seen. When disposed in front of a plasma display or the like, the obtained filter looked green.

TABLE 3

| Ingredient | Material | Amount |
|---|---|---|
| Near-infrared-absorbing | Diimmonium salt compound, Kyasorb IRG-022 manufactured by Nippon Kayaku Co., Ltd. | 3.2 wt. parts |

TABLE 3-continued

| Ingredient | Material | Amount |
|---|---|---|
| material | Fluorine-containing phthalocyanine compound, Excolor IR-1 manufactured by Nippon Shokubai Co., Ltd. | 0.5 wt. part |
| | Dithiol metal complex compound, SIR-159 manufactured by Mitsui Chemcials, Inc. | 1.6 wt. parts |
| Binder resin | Vylon RV 200 manufactured by Toyo Boseki K.K. | 440 wt. parts |
| Solvent | Methyl ethyl ketone | 490 wt. parts |
| | Tetrahydrofuran | 490 wt. parts |
| | Toluene | 490 wt. parts |

EXAMPLE 2

A coating solution was prepared using the polyester copolymer resin (A1) described in Example 1 together with the other ingredients shown in Table 1 in the proportions indicated therein. The coating solution thus obtained was applied to a highly transparent polyester film substrate of 100 μm thickness (product of Toyo Boseki K.K., "Cosmoshine A 4300", total transmittance 90.9%, haze 0.7, coefficient of static friction (both surfaces) 0.58, coefficient of dynamic friction (both surfaces) 0.42) by a gravure roll. The deposited layer was dried for 1 minute by feeding hot air at a wind velocity of 5 m/s and a temperature of 130° C. and then the filter was wound into a roll. The resulting coating layer had a thickness of 8.0 pm. The amount of residual solvents in the coating layer was 4.1 wt %. The filter had a high slidability and showed a good roll appearance.

The obtained infrared absorption filter looked dark gray when seen. The spectral property of the filter is shown in FIG. 9. As shown in FIG. 9, the absorption was plotted as flat in the visible light region in the wavelength range of 400 to 650 nm. The sharp absorption was observed at a wavelength of 700 nm or more.

The obtained filter was left to stand in the atmosphere of a temperature of 60° C. and a humidity of 95% for 1000 hours, and the spectral property was evaluated again with the results shown in FIG. 10. The filter showed no great change in the spectral curve and exhibited stable performance.

Comparative Example 3

The coating solution used in Example 1 was applied to a highly transparent polyester film substrate (product of Toyo Boseki K.K., "Cosmoshine A 4300") by a gravure roll. The deposited layer was dried for 1 minute by feeding hot air at a wind velocity of 5 m/s and a temperature of 120° C. The coating layer had a thickness of 11 μm. The amount of residual solvents in the coating layer was 6.5 wt. %. The filter looked dark gray when seen. The spectral property of the filter is shown in FIG. 11. As shown in FIG. 11, the absorption was plotted as flat in the visible light region in the wavelength range of 450 to 650 nm. The sharp absorption was observed at a wavelength of 700 nm or more.

The obtained filter was left to stand in the atmosphere of a temperature of 60° C. and a humidity of 95% for 1000 hours, and the spectral property was evaluated again with the results shown in FIG. 12. As indicated in FIG. 12, the absorption in the near-infrared region lowered and the color of the filter turned yellowish green.

EXAMPLE 3

In the transparent polyester film having the infrared-absorbing layer as obtained in Example 2, a hard coat-treated layer (HC) was formed on the surface of the side opposed to the infrared-absorbing layer. Used as a hard coat material was a UV-curable resin composition comprising 100 parts of an epoxy acrylic resin and 4 parts of benzophenone. The hard coat-treated layer was formed by a bar coat method. Then, preliminary drying was conducted at 80° C. for 5 minutes and the layer was cured by UV radiation with 500 mJ/cm$^2$. The cured hard coat-treated layer (HC) had a thickness of 5 μm.

Copper foil of 9 μm thickness was bonding to the surface of infrared-absorbing layer with a UV-curing adhesive, the bonded copper foil was patterned with photoresist and etched to give a an electromagnetic wave shielding layer. The copper foil had lines of 15 μm width, a pitch of 115 μm and an aperture ration of 75%.

FIG. 13 shows the spectral property of the filter having, as described above, the hard coat-treated layer on one side of the transparent polyester film substrate, and the infrared-absorbing layer and the electromagnetic wave shielding layer superposed in this order on the other side thereof. As shown in FIG. 13, it was found that the filter can absorb near-infrared rays, has a gray color and exhibits a high visible light transmission while absorbing an electromagnetic wave.

The obtained filter was left to stand in the atmosphere of a temperature of 60° C. and a humidity of 95% for 1000 hours, and the spectral property was evaluated again with the following results. Although a little changed in color, the filter maintained the near-infrared absorbing property. When disposed in front of a plasma display or the like, the obtained filter did not undergo change of color and increased the contrast, resulting in the decrease in radiation of near-infrared beams and in radiation of electromagnetic wave.

EXAMPLE 4

In the transparent polyester film having an infrared-absorbing layer as obtained in Example 2, a hard coat-treated layer (HC) was formed on the surface of the side opposed to the infrared-absorbing layer. Used as a hard coat material was a UV-curing resin composition comprising 100 parts of an epoxy acrylic resin and 4 parts of benzophenone. The hard coat-treated layer was formed by a bar coat method. Then, preliminary drying was conducted at 80° C. for 5 minutes and the layer was cured by UV radiation with 500 mJ/cm$^2$. The cured hard coat-treated layer (HC) had a thickness of 5 μm.

A thin film of tin oxide with 380 Å thickness was formed on the infrared-absorbing layer by a high-frequency magnetron sputtering device. Then a thin film of silver with 200 Å thickness was laminated on said thin film by a DC magnetron sputtering device. Further a thin film of tin oxide with 410 Å thickness was laminated thereon to form a electromagnetic wave shielding layer. The electromagnetic wave shielding layer had a surface resistance value of 4 Ω/□. FIG. 14 shows the spectral property of the filter having, as described above, the hard coat-treated layer on one side of the transparent polyester film substrate, and the infrared-absorbing layer and the electromagnetic wave shielding layer laminated in this order on the other side thereof. As shown in FIG. 14, the filter can absorb near-infrared rays, has a gray color, and exhibits a high visible light transmission while absorbing the electromagnetic wave.

The obtained filter was left to stand in the atmosphere of a temperature of 60° C. and a humidity of 95% for 1000 hours, and the spectral property was evaluated again with the following results. Although a little changed in color, the filter maintained the near-infrared absorbing property. When disposed in front of a plasma display or the like, the obtained filter did not undergo change of color and increased the contrast, resulting in the decrease in radiation of near-infrared beams and in radiation of electromagnetic wave.

EFFECTS OF THE INVENTION

Figure 1:
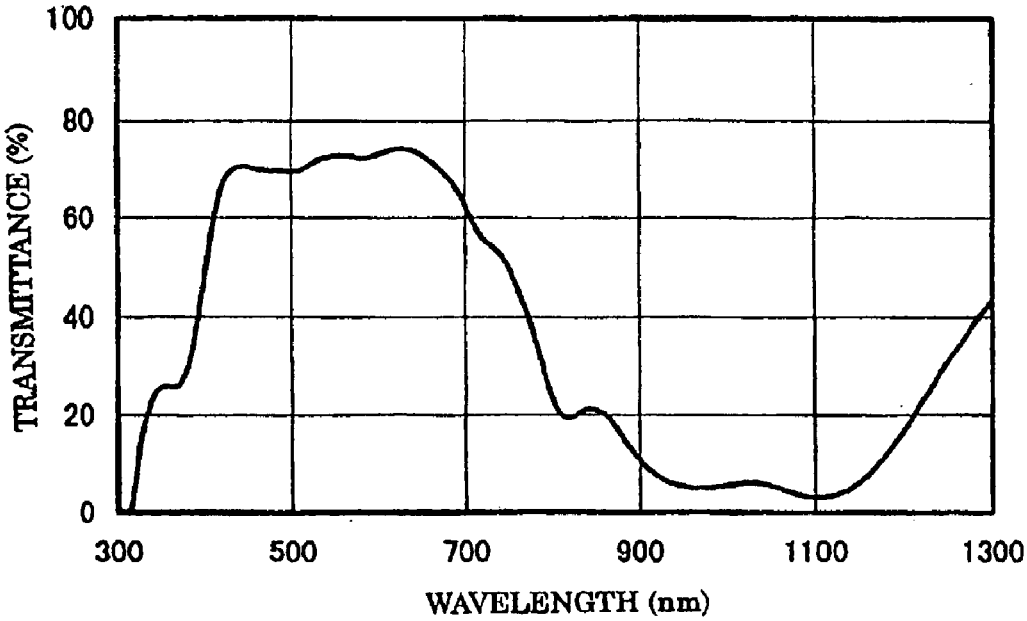
FIG. 1 shows the spectral property of the infrared absorption filter prepared in Example 1.
Figure 2:
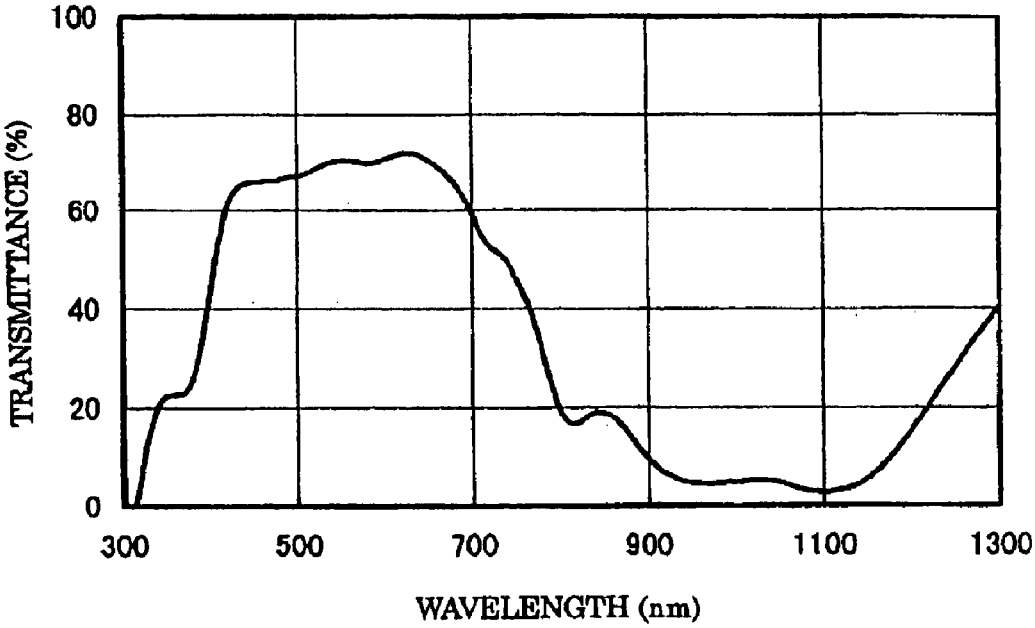
FIG. 2 shows the spectral property of the infrared absorption filter prepared in Example 1 after the filter was left to stand in the atmosphere of a temperature of 60° C. and a humidity of 95% for 1000 hours.
Figure 3:
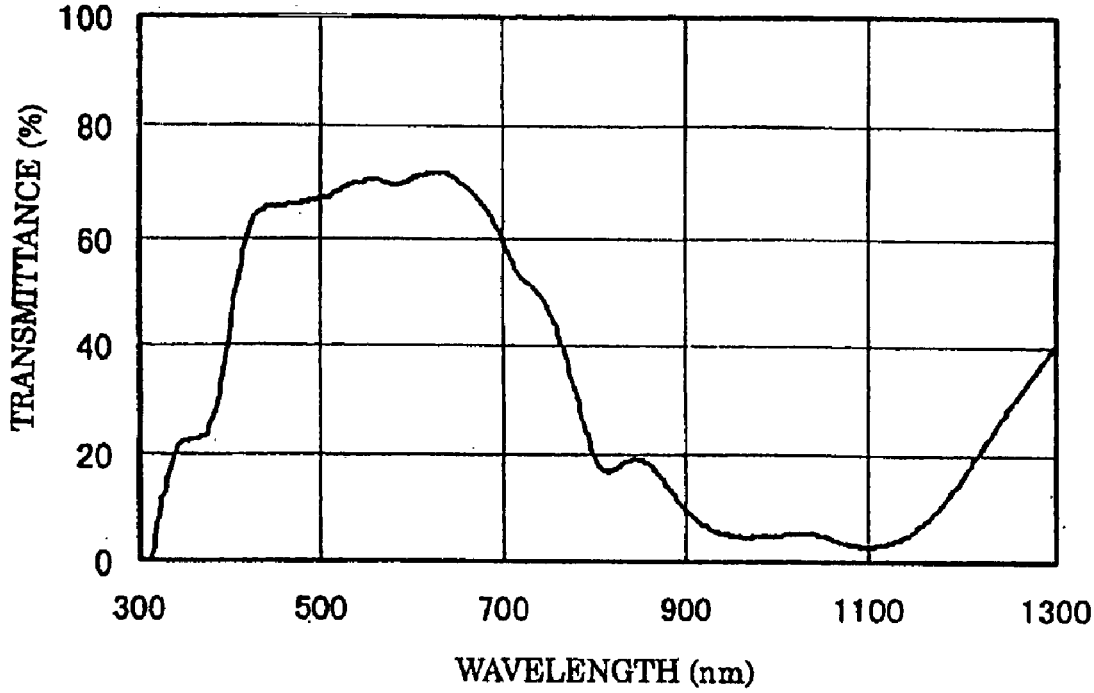
FIG. 3 shows the spectral property of the infrared absorption filter prepared in Example 1 after the filter was left to stand in the atmosphere of a temperature of 80° C. for 1000 hours.
Figure 4:
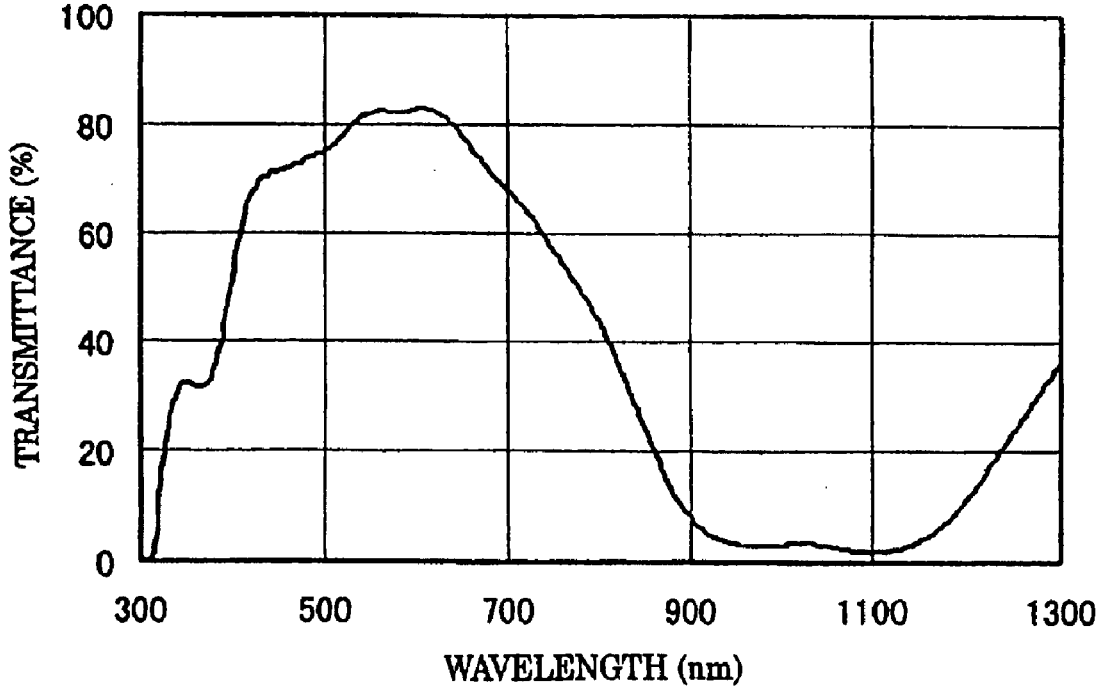
FIG. 4 shows the spectral property of the infrared absorption filter prepared in Comparative Example 1.
Figure 5:
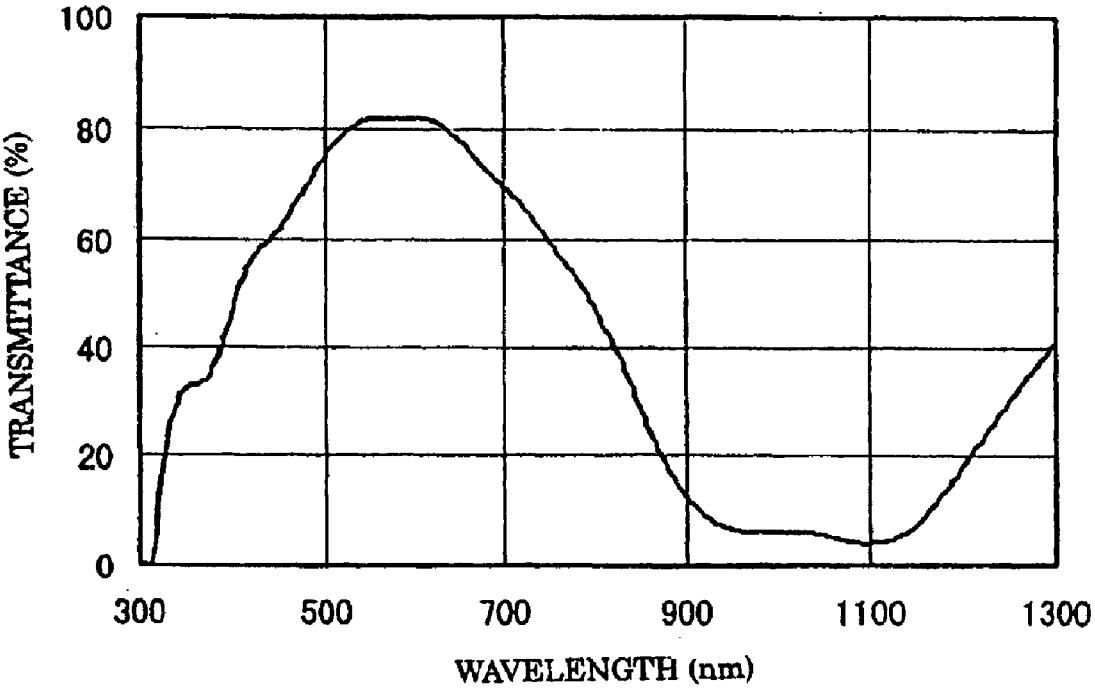
FIG. 5 shows the spectral property of the infrared absorption filter prepared in Comparative Example 1 after the filter was left to stand in the atmosphere of a temperature of 60° C. and a humidity of 95% for 1000 hours.
Figure 6:
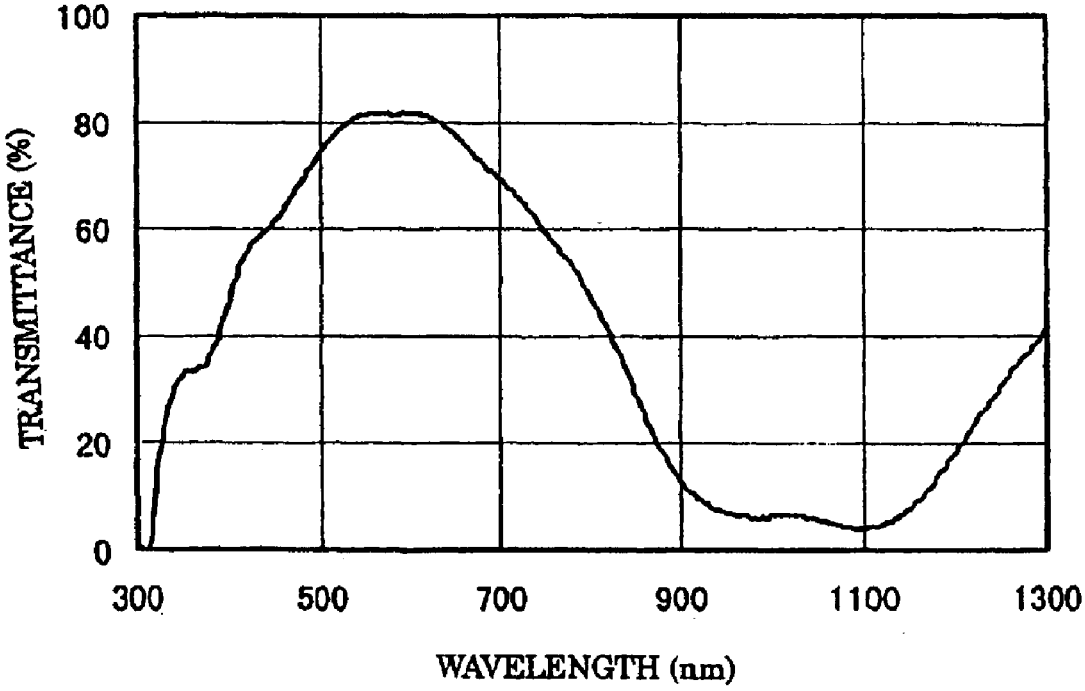
FIG. 6 shows the spectral property of the infrared absorption filter prepared in Comparative Example 1 after the filter was left to stand in the atmosphere of a temperature of 80° C. for 1000 hours.
Figure 7:
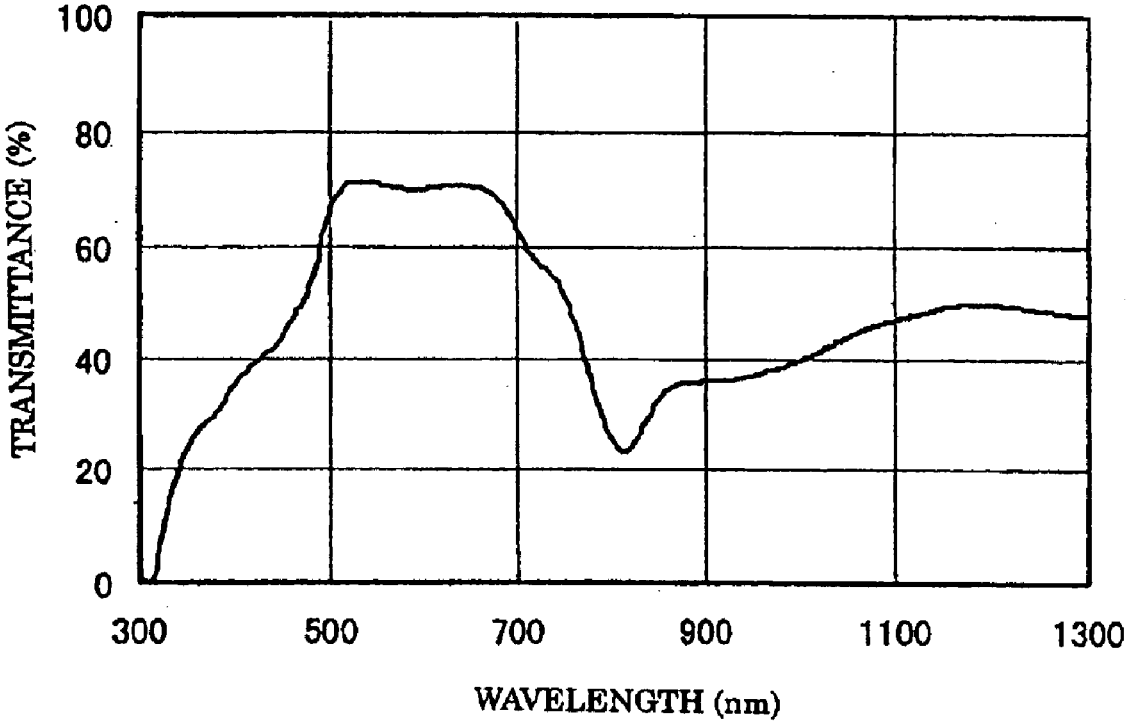
FIG. 7 shows the spectral property of the infrared absorption filter prepared in Comparative Example 2 after the filter was left to stand in the atmosphere of a temperature of 60° C. and a humidity of 95% for 1000 hours.
Figure 8:
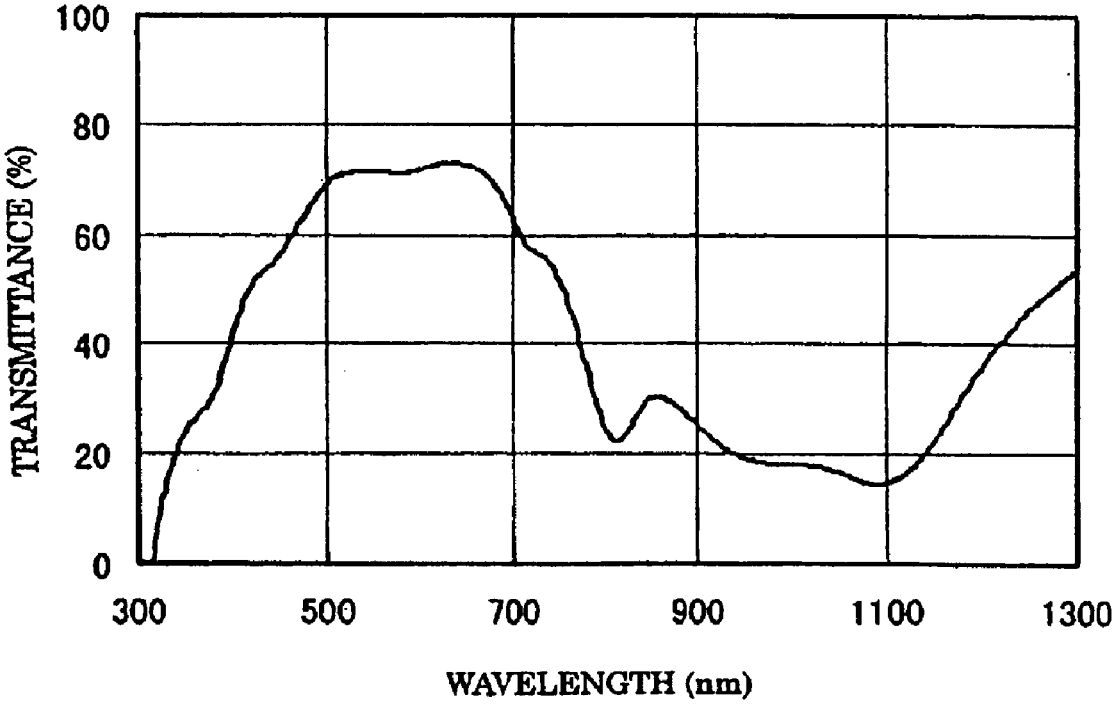
FIG. 8 shows the spectral property of thy infrared absorption filter prepared in Comparative Example 2 after the filter was left to stand in the atmosphere of a temperature of 80° C. for 1000 hours.
Figure 9:
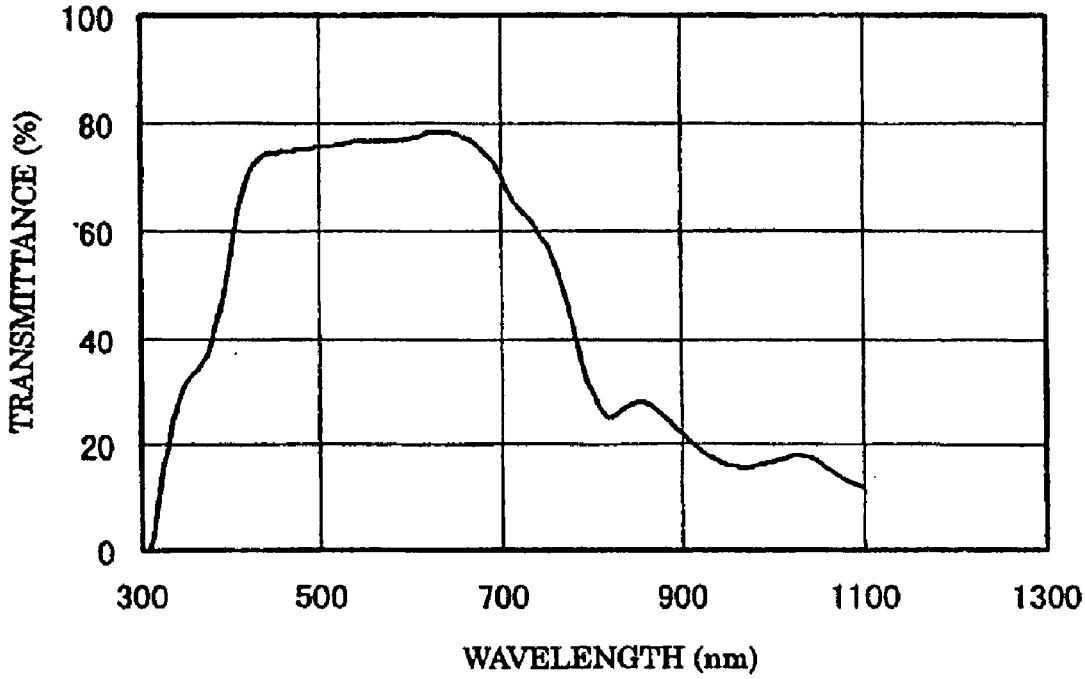
FIG. 9 shows the spectral property of the infrared absorption filter prepared in Example 2.
Figure 10:
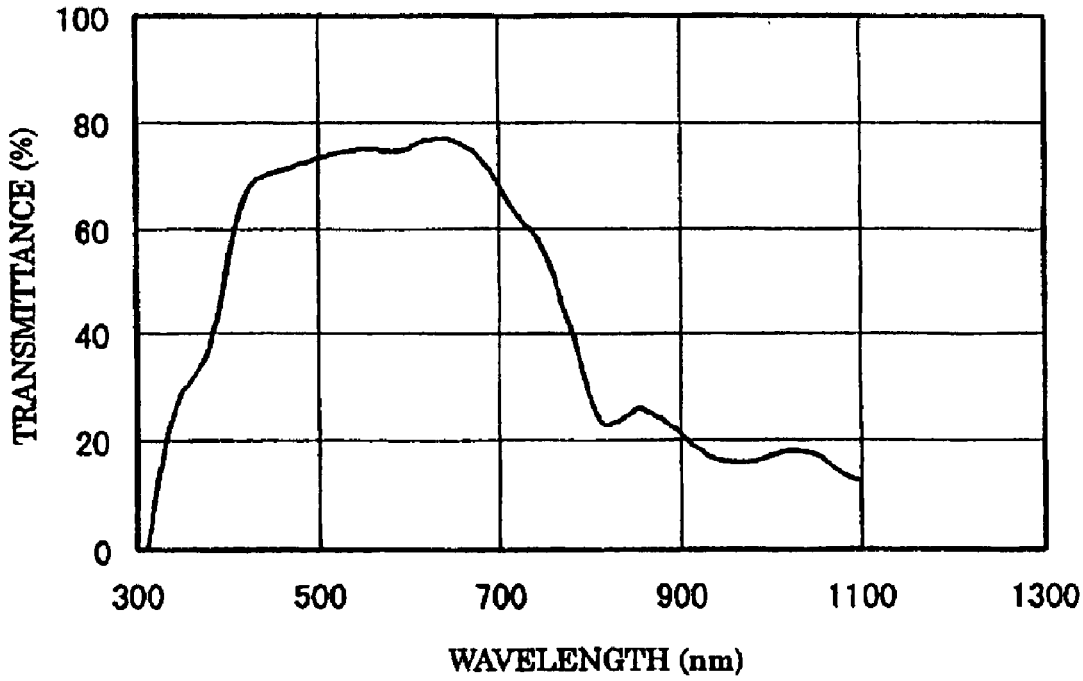
FIG. 10 shows the spectral property of the infrared absorption filter prepared in Example 2 after the filter was left to stand in the atmosphere of a temperature of 60° C. and a humidity of 95% for 1000 hours.
Figure 11:
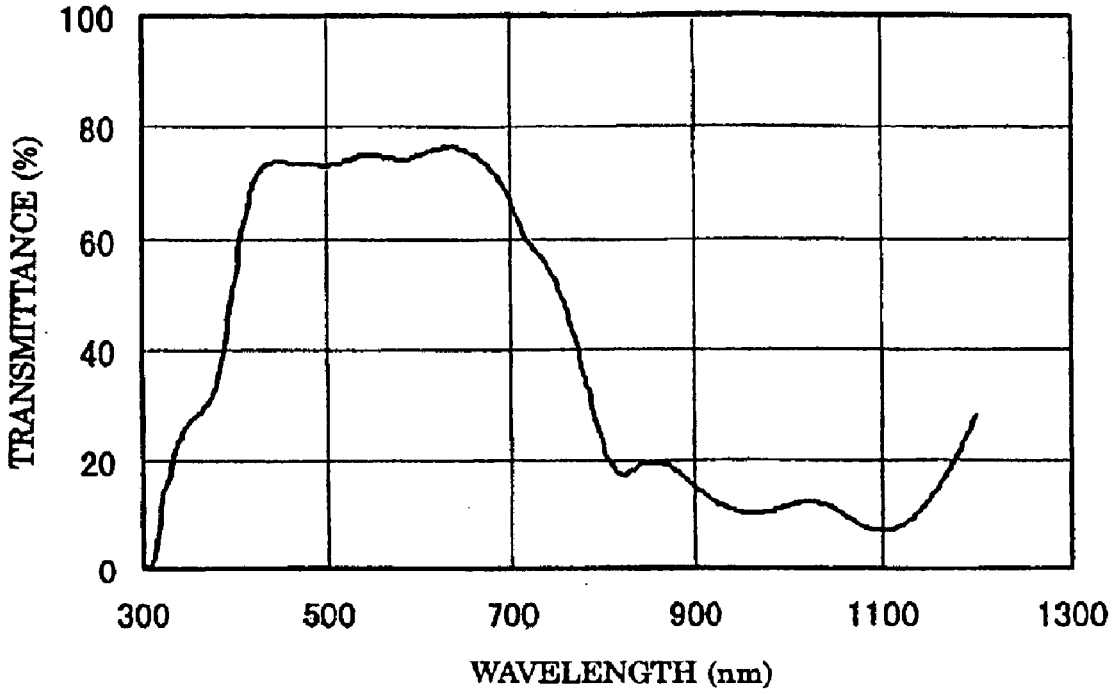
FIG. 11 shows the spectral property of the infrared absorption filter prepared in Comparative Example 3.
Figure 12:
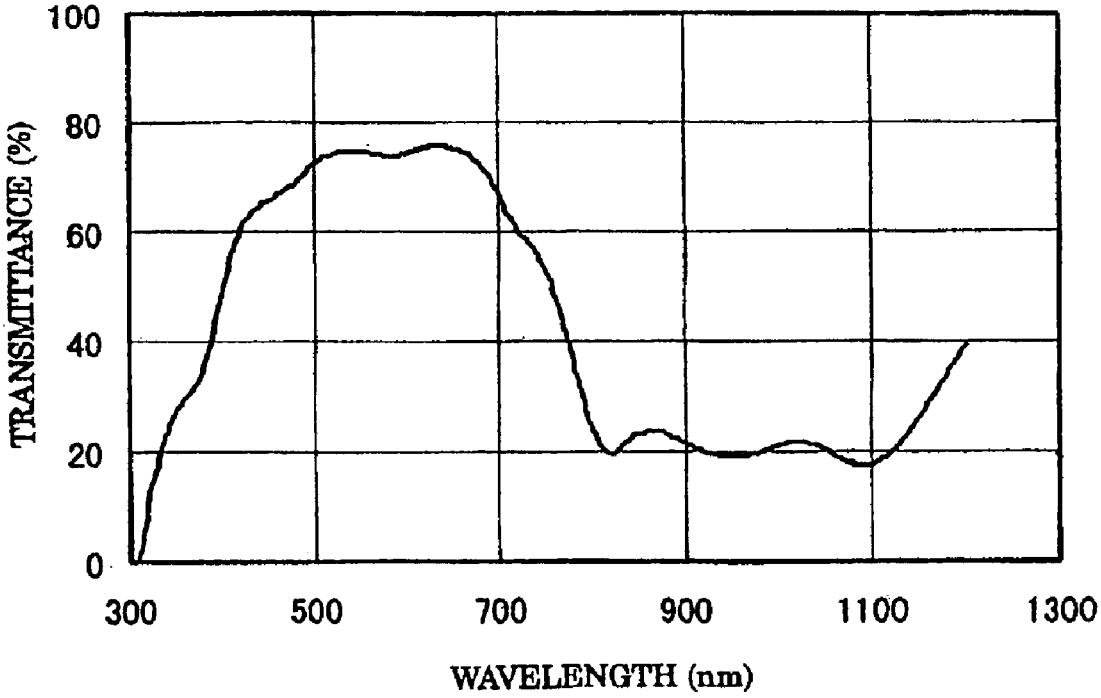
FIG. 12 shows the spectral property of the infrared absorption filter prepared in Comparative Example 3 after the filter was left to stand in the atmosphere of a temperature of 60° C. and a humidity of 95% for 1000 hours.
Figure 13:
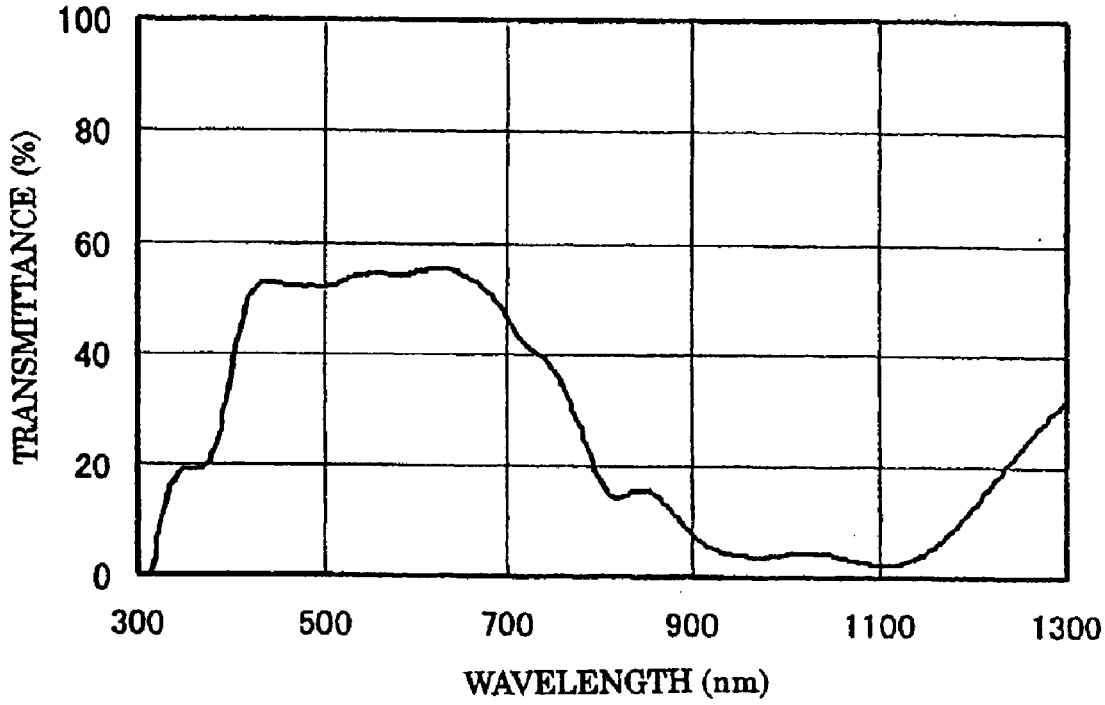
FIG. 13 shows the spectral property of the infrared absorption filter prepared in Example 3.
Figure 14:
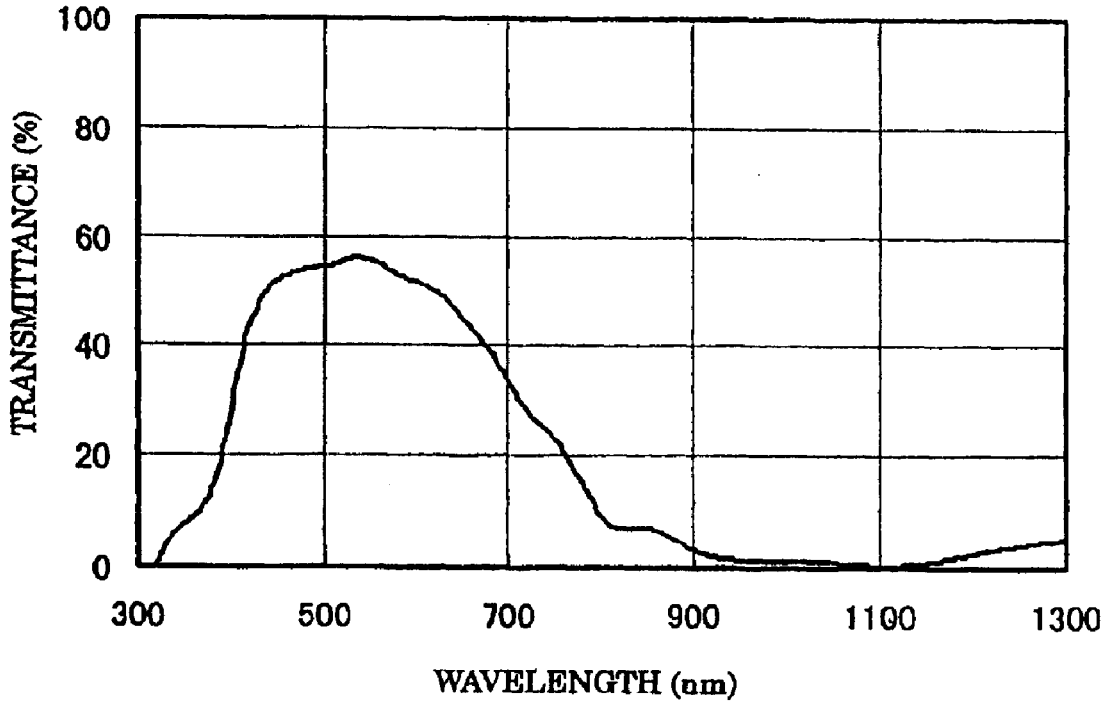
FIG. 14 shows the spectral property of the infrared absorption filter prepared in Example 4.

The infrared absorption filter of the present invention has broad absorption in the near-infrared region, shows a high visible light transmission and does not markedly absorb a specific light in the visible light wavelengths. When used for a plasma display or the like, the filter can absorb the unwanted infrared radiation emitted from the display, thereby making it possible to prevent erroneous operational of a remote control using infrared radiation. The infrared absorption filter of the present invention is gray in color so that it is unlikely to cause color change when used for a video camera, display or the like. Further the filter of the invention has such a high environmental stability that the filter can maintain said properties in an environment of a high temperature and a high humidity.

What is claimed is:

[1. An infrared absorption filter which has a transmittance of not higher than 30% in the near-infrared region in the wavelength range of 800 to 1100 nm;

a difference of 10% or less between a maximum value and a minimum value of transmittance in the visible light region in the wavelength range of 450 to 650 nm; and a transmittance of not lower than 50% at a wavelength of 550 nm, said filter, after being left to stand in the air atmosphere at a temperature of 60° C. and a humidity of 95% for 1000 hours, having a transmittance of not higher than 30% in the near-infrared region in the wavelength range of 800 to 1100 nm, and a difference of 10% or less between a maximum value and a minimum value of transmittance in the visible light region in the wavelength range of 450 to 650 nm, said filter having an infrared-absorbing layer on a transparent substrate, the infrared-absorbing layer being composed of a coloring matter, dye or pigment absorbing infrared radiation and a polymer serving as a dispersing medium and the transparent substrate having a total light transmittance of not lower than 89%, a haze of not higher than 1.6%, a coefficient of static friction of not higher than 0.6 and a coefficient of dynamic friction of not higher than 0.6.]

[2. The infrared absorption filter according to claim 1, wherein after being left to stand in the air atmosphere at a temperature of 80° C. for 1000 hours, the filter has a transmittance of not higher than 30% in the near-infrared region in the wavelength of 800 to 1100 nm and has a difference of 10% or less between a maximum value and a minimum value of transmittance in the visible light region in the wavelength of 450 to 650 nm.]

[3. The infrared absorption filter according to claim 1, wherein the amount of a solvent remaining in the infrared-absorbing layer is 5.0 wt % or less.]

[4. The infrared absorption filter according to claim 1, wherein the transparent substrate is a polyester film.]

[5. The infrared absorption filter according to claim 1, wherein the polymer constituting the infrared-absorbing layer has a glass transition temperature of not lower than 80° C.]

[6. The infrared absorption filter according to claim 5, wherein the polymer constituting the infrared-absorbing layer is a polyester resin.]

[7. The infrared absorption filter according to claim 1, wherein the filter has an electroconductive layer of metal mesh having an aperture ratio of not less than 50% on the same side as the infrared-absorbing layer of the filter or on the opposed side thereof.]

[8. The infrared absorption filter according to claim 1, wherein the filter has a transparent electroconductive layer on the same side as the infrared-absorbing layer of the filter or on the opposed side thereof.]

[9. The infrared absorption filter according to claim 8, wherein the transparent electroconductive layer is formed of a metal oxide.]

[10. The infrared absorption filter according to claim 8, wherein the transparent electroconductive layer has a repeatedly laminated structure in which at least three layers are laminated in the order of metal oxide/metal/metal oxide.]

[11. The infrared absorption filter according to claim 10, wherein the constituent metal layer of the transparent electroconductive layer is formed of silver, gold or a compound containing any of them.]

[12. The infrared absorption filter according to claim 1, wherein a hard coat-treated layer is formed as an outermost layer of the filter.]

[13. The infrared absorption filter according to claim 1, wherein an antireflection layer is formed as an outermost layer of the filter.]

[14. The infrared absorption filter according to claim 1, wherein an antiglare-treated layer is formed as an outermost layer of the filter.]

[15. The infrared absorption filter according to claim 1, wherein the filter is disposed in front of a plasma display.]

*16. An infrared absorption filter comprising a transparent substrate and an infrared-absorbing layer formed thereon,*

*the filter being prepared by coating the transparent substrate with a coating solution comprising an infrared-absorbing material, a binder resin and a solvent,*

*the binder resin being selected from polyester resins, acrylic resins, polyamide resins, polyurethane resins, polyolefin resins and polycarbonate resins, and*

*the amount of the solvent remaining in the infrared-absorbing layer being 5.0 wt. % or less.*

*17. The infrared absorption filter according to claim 16, wherein the binder resin has a glass transition temperature of not lower than 80° C.*

*18. The infrared absorption filter according to claim 16, wherein the binder resin is a polyester resin.*

*19. The infrared absorption filter according to claim 16, wherein the filter has an electroconductive layer of metal mesh having an aperture ratio of not less than 50% on the same side as the infrared-absorbing layer of the filter or on the opposed side thereof.*

*20. The infrared absorption filter according to claim 16, wherein the filter has a transparent electroconductive layer on the same side as the infrared-absorbing layer of the filter or on the opposed side thereof.*

*21. The infrared absorption filter according to claim 20, wherein the transparent electroconductive layer is formed of a metal oxide.*

*22. The infrared absorption filter according to claim 20, wherein the transparent electroconductive layer has a repeatedly laminated structure in which at least three layers are laminated in the order of metal oxide/metal/metal oxide.*

*23. The infrared absorption filter according to claim 22, wherein the constituent metal layer of the transparent electroconductive layer is formed of silver, gold or a compound containing any of them.*

*24. The infrared absorption filter according to claim 16, wherein a hard coat-treated layer is formed as an outermost layer of the filter.*

*25. The infrared absorption filter according to claim 16, wherein an antireflection layer is formed as an outermost layer of the filter.*

*26. The infrared absorption filter according to claim 16, wherein an antiglare-treated layer is formed as an outermost layer of the filter.*

*27. The infrared absorption filter according to claim 16, wherein the filter is disposed in front of a plasma display.*

*28. The infrared absorption filter according to claim 16, wherein the filter has a transmittance of not higher than 30% in the near-infrared region in the wavelength range of 800 to 1100 nm, and*

*after being left to stand in the air atmosphere at a temperature of 60° C. and a humidity of 95% for 1000 hours, the filter has a transmittance of not higher than 30% in the near-infrared region in the wavelength range of 800 to 1100 nm.*

*29. The infrared absorption filter according to claim 28, wherein the filter has a difference of 10% or less between the maximum value and the minimum value of transmittance in the visible light region in the wavelength range of 450 to 650 nm and a transmittance of not lower than 50% at a wavelength of 550 nm, and*

*after being left to stand in the air atmosphere at a temperature of 60° C. and a humidity of 95% for 1000 hours, the filter has a difference of 10% or less between the maximum value and the minimum value of transmittance in the visible light region in the wavelength range of 450 to 650 nm.*

*30. The infrared absorption filter according to claim 16, wherein the filter has a transmittance of not higher than 30% in the near-infrared region in the wavelength range of 800 to 1100 nm, and*

*after being left to stand in the air atmosphere at a temperature of 80° C. for 1000 hours, the filter has a transmittance of not higher than 30% in the near-infrared region in the wavelength range of 800 to 1100 nm.*

*31. The infrared absorption filter according to claim 30, wherein the filter has a difference of 10% or less between the maximum value and the minimum value of transmittance in the visible light region in the wavelength range of 450 to 650 nm and a transmittance of not lower than 50% at a wavelength of 550 nm, and*

*after being left to stand in the air atmosphere at a temperature of 80° C. for 1000 hours, the filter has a difference of 10% or less between the maximum value and the minimum value or transmittance in the visible light region in the wavelength range of 450 to 650 nm.*

*32. The infrared absorption filter according to claim 16, wherein the infrared-absorbing material contains a dimmonium salt compound.*

*33. The infrared absorption filter according to claim 32, wherein the dimmonium salt compound is represented by the formula (1):*

(1)

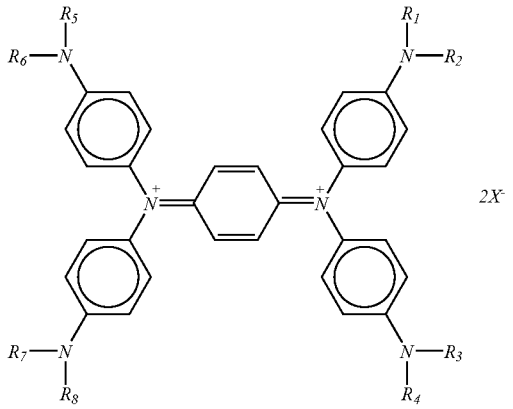

*wherein $R_1$-$R_8$ are the same or different from each other and each represents hydrogen or alkyl having 1 to 12 carbon atoms, and X represents $SbF_6$, $ClO_4$, $PF_6$, $NO_3$ or halogen.*

*34. The infrared absorption filter according to claim 16, wherein the infrared-absorbing material contains at least two species of dimmonium salt compound, fluorine-containing phthalocyanine compound and nickel complex compound.*

* * * * *

UNITED STATES PATENT AND TRADEMARK OFFICE

CERTIFICATE OF CORRECTION

PATENT NO. : RE 39,857 E
APPLICATION NO. : 10/897393
DATED : September 25, 2007
INVENTOR(S) : Tetsuo Shimomura et al.

It is certified that error appears in the above-identified patent and that said Letters Patent is hereby corrected as shown below:

On the title page:
Abstract, Line 17, change “originated” to --originating--.

Column 1, Line 26, change “of video camera:” to --of a video camera:--.

Column 1, Line 52, change “of red color” to --of the red color--.

Column 2, Lines 9-10, change “absorbing a visible light” to --absorbing visible light--.

Column 2, Line 33, change “value, of” to --value of--.

Column 4, Line 30, change “Preferably” to --Preferably,--.

Column 5, Line 16, change “Desirably” to --Desirably,--.

Column 5, Line 34, change “not” to --no--.

Column 5, Line 46, change “0 part” to --0 parts--.

Column 5, Line 49, change “N,N,N', N'-” to --N,N,N',N'--.

Column 5, Lines 51-61, each occurence, change “diimmonium.” to --diimmonium--.

Column 7, Line 14, change “e.g.” to --e.g.,--.

Column 7, Line 16, change “Limited” to --limited--.

Column 7, Line 36, change “etc.” to --etc.,--.

Column 7, Line 55, change “of intermediate” to --of the intermediate--.

Column 10, Line 16, change “qf” to --of--.

Column 11, Line 18, change “the the” to --the--.

Column 11, Line 39, change “of” to --or--.

Column 14, Line 10, change “bonding” to --bonded--.

Column 14, Line 11, change “of infrared-absorbing” to --of the infrared-absorbing--.

UNITED STATES PATENT AND TRADEMARK OFFICE

CERTIFICATE OF CORRECTION

PATENT NO. : RE 39,857 E
APPLICATION NO. : 10/897393
DATED : September 25, 2007
INVENTOR(S) : Tetsuo Shimomura et al.

It is certified that error appears in the above-identified patent and that said Letters Patent is hereby corrected as shown below:

Column 14, Line 13, change “a an” to --an--.

Column 14, Line 15, change “ration” to --ratio--.

Column 14, Line 34, change “of electromagnetic wave.” to --of electronmagnetic waves.--.

Column 14, Line 52, change “Further” to --Further,--.

Column 14, Line 53, change “to form a” to --to form an--.

Column 15, Line 6, change “electromagnetic wave” to --electronmagnetic waves--.

Column 15, Line 35, change “thy” to --the--.

Column 15, Line 64, change “operational” to --operation--.

In Claim 32, lines 2 and 3, change “a dimmonium salt” to --a diimmonium salt--.

In Claim 33, line 2, change “a dimmonium salt” to --a diimmonium salt--.

In Claim 34, line 3, change “a dimmonium salt” to --a diimmonium salt--.

Signed and Sealed this

Twenty-sixth Day of August, 2008

JON W. DUDAS
*Director of the United States Patent and Trademark Office*

UNITED STATES PATENT AND TRADEMARK OFFICE

CERTIFICATE OF CORRECTION

PATENT NO. : RE 39,857 E
APPLICATION NO. : 10/897393
DATED : September 25, 2007
INVENTOR(S) : Tetsuo Shimomura et al.

It is certified that error appears in the above-identified patent and that said Letters Patent is hereby corrected as shown below:

On the title page:
Abstract, Line 17, change “originated” to --originating--.

Column 1, Line 26, change “of video camera:” to --of a video camera:--.

Column 1, Line 52, change “of red color” to --of the red color--.

Column 2, Lines 9-10, change “absorbing a visible light” to --absorbing visible light--.

Column 2, Line 33, change “value, of” to --value of--.

Column 4, Line 30, change “Preferably” to --Preferably,--.

Column 5, Line 16, change “Desirably” to --Desirably,--.

Column 5, Line 34, change “not” to --no--.

Column 5, Line 46, change “0 part” to --0 parts--.

Column 5, Line 49, change “N,N,N', N'-” to --N,N,N',N'--.

Column 5, Lines 51-61, each occurence, change “diimmonium.” to --diimmonium--.

Column 7, Line 14, change “e.g.” to --e.g.,--.

Column 7, Line 16, change “Limited” to --limited--.

Column 7, Line 36, change “etc.” to --etc.,--.

Column 7, Line 55, change “of intermediate” to --of the intermediate--.

Column 10, Line 16, change “qf” to --of--.

Column 11, Line 18, change “the the” to --the--.

Column 11, Line 39, change “of” to --or--.

Column 14, Line 10, change “bonding” to --bonded--.

Column 14, Line 11, change “of infrared-absorbing” to --of the infrared-absorbing--.

UNITED STATES PATENT AND TRADEMARK OFFICE

CERTIFICATE OF CORRECTION

PATENT NO. : RE 39,857 E
APPLICATION NO. : 10/897393
DATED : September 25, 2007
INVENTOR(S) : Tetsuo Shimomura et al.

It is certified that error appears in the above-identified patent and that said Letters Patent is hereby corrected as shown below:

Column 14, Line 13, change “a an” to --an--.

Column 14, Line 15, change “ration” to --ratio--.

Column 14, Line 34, change “of electromagnetic wave.” to --of electronmagnetic waves.--.

Column 14, Line 52, change “Further” to --Further,--.

Column 14, Line 53, change “to form a” to --to form an--.

Column 15, Line 6, change “electromagnetic wave” to --electronmagnetic waves--.

Column 15, Line 35, change “thy” to --the--.

Column 15, Line 64, change “operational” to --operation--.

Column 18, In Claim 32, lines 34 and 35, change “a dimmonium salt” to --a diimmonium salt--.

Column 18, In Claim 33, line 37, change “a dimmonium salt” to --a diimmonium salt--.

Column 18, In Claim 34, line 63, change “a dimmonium salt” to --a diimmonium salt--.

This certificate supersedes the Certificate of Correction issued August 26, 2008.

Signed and Sealed this

Twenty-third Day of September, 2008

JON W. DUDAS
*Director of the United States Patent and Trademark Office*